Patented Apr. 3, 1951

2,547,679

UNITED STATES PATENT OFFICE 2,547,679

3,3'-BIS-(TRIFLUOROMETHYL) DIPHENYL ETHER

John K. Wolfe, Burnt Hills, N. Y., assignor to General Electric Company, a corporation of New York No Drawing. Application January 19, 1950, Serial No. 139,535

1 Claim. (Cl. 260—613)

This invention is concerned with fluorinated diphenyl ethers. More particularly the invention relates to compositions of matter corresponding to the general formula

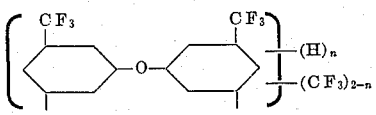

where $n$ is one of the following: 0, 1, 2, and methods of preparing the same.

The compositions embraced by my invention have outstanding chemical stability and heat stability as well as good flame resistance. Several of the compositions of my invention obviate certain difficulties encountered in using diphenyl ethers free of the CF₃ groups.

The compositions of the present invention, because of the aforementioned properties, are useful as heat exchange media, dielectric materials, and transformer fluids where high dielectric strength is desired. Two of my compositions are liquid over a large temperature range which makes them eminently suitable in liquid insulation applications.

Among the compounds coming within the scope of my invention are 3,3'-bis-(trifluoromethyl) diphenyl ether having the formula

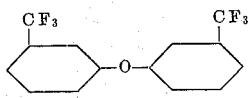

3,3',5'-tris-(trifluoromethyl) diphenyl ether having the formula

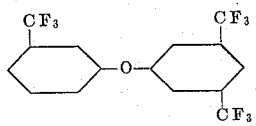

and 3,5,3',5'-tetracis-(trifluoromethyl) diphenyl ether having the formula

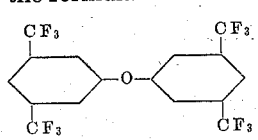

In order that those skilled in the art may better understand how the present invention may be practiced, the following examples are given by way of illustration. All parts are by weight.

EXAMPLE 1

*Preparation of 3,3'-bis-(trifluoromethyl) diphenyl ether*

Fifty parts of m-trifluoromethyl phenol was placed in a small round-bottom flask with 56.3 parts m-bromobenzotrifluoride and 1 part finely divided copper powder. About 9.8 parts potassium metal was added in small pieces and the temperature raised gradually to 210–230° C. and held within this temperature range for about 3¼ hours. The mixture was cooled, filtered, and the salt cake washed well with benzene. Distillation of the reaction product contained in the benzene extraction yielded 53.3 parts of the desired compound boiling at 138.7–138.8° C. at 25 mm. This compound had a refractive index $n_D^{20}=1.4726$. The boiling point at 756 mm. was about 250–250.5° C. Analysis of the compound showed it to contain 55.2% carbon and 2.55% hydrogen (theoretical values are 54.9% carbon and 2.6% hydrogen). This ether was liquid at temperatures as low as −78° C. The dielectric constant of this material was 8.30 at 10,000 cycles, and the power factor at 10,000 was 0.21%. The volume resistivity was $1.1 \times 10^{-19}$ ohm centimeters.

The m-trifluoromethyl phenol employed in Example 1 was prepared by forming a mixture of ingredients comprising 1-amino-3-tri-fluoromethyl benzene (104 grams), 458 grams water, and 159 ml. concentrated sulfuric acid. The mixture was cooled to +5° C. and stirred mechanically. A solution of 50 grams sodium nitrite in 125 ml. water was then added in small portions. The solid material initially present disappeared and another solid reappeared as the reaction progressed. The solution was stirred and allowed to stand at 2° to 5° C. for 1½ hours after which the solution was warmed gently to 60–65° C. at which temperature copious evolution of nitrogen occurred. After decomposition was complete, the mixture was redistilled and the 3-trifluoromethyl phenol obtained was dried over anhydrous calcium sulfate and distilled to yield 88 grams of product boiling at 85.5–86.5° C. at 25 mm.

The m-bromobenzotrifluoride used in the foregoing examples and in the two succeeding examples was prepared by the method of Simons and Ramler as described in J. A. C. S. 65, 389 (1943). The 1-amino-3-trifluoromethyl benzene was prepared by the method described by Drake et al., J. A. C. S. 63, 1602 (1946).

EXAMPLE 2

*Preparation of 3,3',5'-tris-(trifluoromethyl) diphenyl ether*

22.5 parts m-bromobenzotrifluoride and 26.9 parts potassium 3,5-bis-(trifluoromethyl) phenate were mixed with 0.2 part finely divided copper powder in a pressure reactor, the latter closed and heated to 260° C. for 3 hours with shaking. The mixture was cooled, filtered, and the salt cake was extracted with benzene. Distillation of the benzene extract yielded 26.2 parts (approximately a 78.5% yield) of 3,3',5'-tris-(trifluoromethyl) diphenyl ether boiling at 247–247.5° C. at 759 mm. and having a refractive index $n_D^{20}=1.4490$. Analysis of this component showed it to contain 49.1% carbon and 2.3% hydrogen (theoretical values are 48.2% carbon and 1.9% hydrogen).

EXAMPLE 3

*Preparation of 3,5,3',5'-tetracis-(trifluoromethyl) diphenyl ether*

About 15.9 parts potassium 3,5-bis-(trifluoromethyl) phenate, 17.4 parts 1-bromo-3,5-bis-(trifluoromethyl) benzene and 0.5 part finely divided copper powder were mixed together and placed in a pressure reactor and heated to 260° C. for 2 hours with continuous shaking. At the end of this time the reaction mixture was cooled and the resulting solid was extracted with benzene. Evaporation of the benzene yielded 19.2 parts of a light tan crystalline material melting at about 94–95° C. (73.3% yield). Two recrystallizations from benzene yielded 14.4 parts of colorless crystals, melting at 96.3–96.5° C., and having a boiling point of 244.5–244.8° C. at 755 mm. Analysis of this compound, 3,5,3',5'-tetracis-(trifluoromethyl) diphenyl ether, showed it to contain 43.4% carbon and 1.6% hydrogen (theoretical values are 43.45% carbon, 1.37% hydrogen).

The potassium 3,5-bis-(trifluoromethyl) phenate used above was prepared by heating 15.1 parts 3,5-bis-(trifluoromethyl) phenol with 4.5 parts KOH until all the water was driven off. The mixture was cooled and the salt cake was used as such in the above-described examples.

The 1-bromo-3,5-bis-(trifluoromethyl) benzene used above was prepared by forming a mixture of 72.5 grams 1-amino-3,5-bis-(trifluoromethyl) benzene [prepared in accordance with the directions given by Drake et al., J. A. C. S. 68, 1604 (1946)] and a solution of 175 ml. of a 40% hydrobromic acid and 250 ml. water. The mixture was stirred and cooled to 5° C. and a solution of 23.5 grams sodium nitrite in 75 ml. water was added dropwise. The mixture was stirred for ½ hour and 5 grams finely divided copper powder was added. The mixture was warmed slowly to 90–95° C. and held there ½ hour. After reaction was complete the lower layer was separated, washed, and steam-distilled, yielding 33.5 ml. of clear liquid product boiling between 153–4° C. at 760 mm. Redistillation gave the desired product, 1-bromo-3,5-bis-(trifluoromethyl) benzene boiling at 153.9° C. at 760 mm. a melting point around −16° C., and a refractive index $n_D^{20}=1.4277$. Analysis of compound for carbon and hydrogen indicated that the desired material had been obtained.

Proof that 1-bromo-3,5-bis-(trifluoromethyl) benzene was obtained was established by converting the latter to 3,5-bis-(trifluoromethyl) benzoic acid, and then by hydrolysis with $H_2SO_4$ to trimesic acid. This product had a melting point of 375°–380° C. and when mixed with known trimesic acid showed no depression of the melting point.

The 3,5-bis-(trifluoromethyl) phenol was prepared by mixing 71.5 grams 1-amino-3,5-bis-(trifluoromethyl) benzene with a solution of 68 ml. concentrated $H_2SO_4$ and 350 ml. water. The mixture was cooled to 0° C. and a solution of 22 grams sodium nitrite and 75 ml. water was added. The solution was stirred for 30 minutes and then poured into a hot mixture of 500 ml. concentrated $H_2SO_4$ with 75 ml. water. The resulting solution was heated at reflux for ½ hour and steam-distilled to yield 59 grams of a colorless liquid boiling around 97.2° C. at 50 mm., having a melting point of 20.4–21.3° C. and a refractive index $n_D^{20}=1.4618$. Analysis showed the compound to be 3,5-bis-(trifluoromethyl) phenol and was found to contain 41.2% carbon and 1.9% hydrogen (theoretical values 41.7% carbon and 1.8% hydrogen.)

My fluorinated diphenyl ethers show extraordinary stability toward heat when refluxed at their boiling points in the vicinity of 250° C. for times as long as 98 hours. After such periods of heating there is no evidence of decomposition which recommends these compounds for heat transfer applications. In addition, because of the presence of the large amounts of fluorine, my claimed compositions of matter are extremely flame resistant, and can be advantageously used in applications where fire hazards are involved.

It will of course be apparent to those skilled in the art that additional non-flammability and non-volatility can be imparted to my claimed compositions of matter by further halogenating, e. g., chlorinating or fluorinating the benzene nuclei to replace one or more of the hydrogens attached thereto.

What I claim as new and desire to secure by Letters Patent of the United States is:

3,3'-bis-(trifluoromethyl) diphenyl ether having the formula

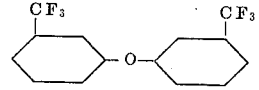

JOHN K. WOLFE.

REFERENCES CITED

The following references are of record in the file of this patent:

UNITED STATES PATENTS

| Number | Name | Date |
|---|---|---|
| 2,464,877 | Markarian et al. | Mar. 22, 1949 |
| 2,471,829 | McBee et al. | May 31, 1949 |
| 2,477,342 | McBee et al. | July 26, 1949 |
| 2,516,403 | McBee et al. | July 25, 1950 |